(12) United States Patent
Berger

(10) Patent No.: US 7,261,667 B2
(45) Date of Patent: Aug. 28, 2007

(54) SYSTEM AND METHOD FOR REDUCING BACKLASH IN A PLANETARY GEAR SET

(75) Inventor: Al Berger, Brownstown, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 171 days.

(21) Appl. No.: 11/163,636

(22) Filed: Oct. 25, 2005

(65) Prior Publication Data

US 2007/0093354 A1    Apr. 26, 2007

(51) Int. Cl.
 *F16H 57/08* (2006.01)
(52) U.S. Cl. ................................... 475/347
(58) Field of Classification Search ............... 475/331, 475/346, 347
See application file for complete search history.

(56) References Cited

U.S. PATENT DOCUMENTS

| | | | |
|---|---|---|---|
| 4,944,195 A * | 7/1990 | Takahashi et al. ............ | 74/409 |
| 5,469,820 A | 11/1995 | Data et al. | |
| 5,551,928 A | 9/1996 | Sudau | |
| 5,570,615 A | 11/1996 | Westphal et al. | |
| 5,657,728 A | 8/1997 | Diggs | |
| 5,791,309 A | 8/1998 | Yamazaki et al. | |
| 6,263,853 B1 | 7/2001 | Rau | |
| 6,516,770 B1 | 2/2003 | Berger et al. | |
| 6,655,340 B2 | 12/2003 | Garza | |

FOREIGN PATENT DOCUMENTS

| | | |
|---|---|---|
| EP | 0599125 B1 | 3/1997 |
| EP | 0499125 B1 | 4/1998 |
| JP | 07-035198 | 2/1995 |
| JP | 2002-357246 | 12/2002 |
| WO | WO 03/004845 A1 | 7/2002 |

* cited by examiner

*Primary Examiner*—Dirk Wright
(74) *Attorney, Agent, or Firm*—Bir Law, PLC; David S. Bir

(57) ABSTRACT

Systems and methods for reducing or eliminating backlash to control gear rattle include a planetary gear set with a planet carrier including a first part that supports at least one forward-torque carrying planet gear that has at least one tooth contacting a drive side of gear teeth of an associated sun gear and ring gear and a second part that supports at least one reverse-torque carrying gear that has at least one tooth contacting a coast side of gear teeth of the associated sun gear and ring gear, the second part of the carrier being rotationally biased relative to the first part to reduce or eliminate effective backlash of the gear set.

20 Claims, 7 Drawing Sheets

SYSTEM AND METHOD FOR REDUCING BACKLASH IN A PLANETARY GEAR SET

BACKGROUND OF THE INVENTION

1. Field of the Invention

The present invention relates to systems and methods for controlling gear rattle by substantially eliminating backlash in a planetary gear set.

2. Background Art

Mating gear teeth in a pair of gears have an inherent amount of backlash attributable to clearance required to accommodate manufacturing variation and thermal expansion, which may allow an unacceptable amount of rattle during operation, particularly when experiencing frequent torque reversals between left and right hand (also referred to as clockwise/counter clockwise, positive/negative, drive/coast, or forward/reverse) torques. Prior art solutions to this problem include reduction or elimination of backlash by varying the center distance between gears or changing tooth thickness. One solution to eliminating backlash in external gears is disclosed in U.S. Pat. No. 4,688,441 in which one of the gears is split axially into two parts that are under spring load, rotatable relative to each other. One part of the split gear maintains tight contact against the driving face of the mating gear, and the other part against the coasting face. To eliminate backlash, the spring preload has to be at least as large as the maximum load that will be imposed upon the spring during operation of the gear. This solution is applied to non-planetary type gears and requires one of the gears to be axially split.

To reduce backlash related rattle in a planetary type gear set as disclosed in U.S. Pat. No. 4,799,396, a planetary gear set includes an output shaft rotatably supporting two planet gears engaging an internal gear fixed to a housing and a sun gear at the end of the input shaft. Supports for the planet gears are circumferentially movable during a manual adjustment procedure with respect to each other in order to eliminate backlash. Similarly, U.S. Pat. No. 6,099,432 describes a planetary gear set having a divided-type carrier that can be twisted using axial holes to manually adjust for backlash during or after assembly. Manually adjusting backlash as described in these disclosures may result in additional noise and produce high internal stresses related to gear run-out and an associate tight contact or binding condition during subsequent operation.

U.S. Pat. No. 5,098,359 discloses a reduction gear assembly having low elasticity between planet gears to provide elastic compliance between input and output members in forward as well as backward directions of torque transmission. The low elasticity in both forward and backward directions could lead to unacceptable vibrational resonance if the input or output is subjected to torsional vibrations. U.S. Published App. No. 2003/0073537 discloses a differential planetary gear system having an additional planetary gear at each position, an additional ring gear and a pre-load mechanism to reduce backlash.

SUMMARY OF THE INVENTION

The present invention provides systems and methods for reducing or eliminating backlash to control gear rattle that include a planetary gear set with a planet carrier including a first part that supports at least one forward-torque carrying planet gear that contacts the drive side of at least one tooth of both an associated sun gear and ring gear, and a second part that supports at least one reverse-torque carrying planet gear that contacts the coast side of gear teeth of the associated sun gear and ring gear, the second part of the carrier being rotationally biased with a spring preload relative to the first part to reduce or eliminate effective backlash of the gear set.

In one embodiment, the first and second parts of the planet carrier are spring loaded relative to each other. One or more springs are disposed between the first and second parts at approximately the middle of the face width of the teeth of the planet pinion gears mounted on the planet carrier. A plurality of planet pinion gears are mounted on the first part of the planet carrier, which is held stationary, and as many planet pinion gears are mounted on the moveable second part of the planet carrier. The gear teeth of planet pinion gears mounted on the stationary first part of the planet carrier maintain contact against the drive sides of the gear teeth on mating gears whereas the gear teeth of planet pinion gears mounted on the second moveable part of the planetary carrier maintain contact with the coast sides of the gear teeth on mating gears. During normal operation, the planet pinion gears mounted to the stationary first part of the planet carrier carry the load of the input torque, as well as the spring preload between the two carriers, while the planet pinion gears mounted to the moveable second part of the planet carrier are loaded not greater than the spring preload between the two parts of the planet carrier. Both the stationary first part and the moveable second part of the planet carrier have a rigid hoop structure at both ends of each of the axle shafts that support the planet gears, with additional structure to attach the hoops of each part to each other. This rigid structure ensures that the gears will maintain proper centerline alignment even when they are carrying a heavy load. The spring preload between the two parts of the carrier assembly should be at least as large as the maximum load that will be imposed in the reverse direction during operation of the gear set for most advantageous operation. This type of construction provides essentially zero backlash in all angular positions under normal operating conditions without forcing mating gear teeth to be in a tight, noncompliant mesh condition. In addition, the spring load prevents creation of high stresses due to gear run-out.

In one embodiment, the second part of the carrier assembly includes fewer planet pinion gears than the first part of the carrier assembly. Another embodiment includes multiple compression springs disposed between the first and second parts of the carrier with the axial locations of such springs being on either side of the planet pinion gears.

The present invention provides a number of advantages. For example, the present invention provides systems and methods for reducing or eliminating gear rattle by eliminating backlash in a planetary gear set without changing the center distance between gears, gear tooth thickness, or gear tooth profile. The present invention eliminates backlash using an automatic and dynamic adjustment without requiring any manual adjustment. The present invention does not require external tools to adjust gear position to eliminate backlash after assembly. Eliminating backlash using the present invention does not force the gears into a tight, noncompliant mesh condition due to gear run-out or thermal expansion and therefore does not compromise durability or performance or generate additional gear noise within the planetary gear set. The present invention offers high torsional stiffness in the positive torque transmission direction equivalent to the stiffness of a conventional planetary gear set and also in the direction of backward or reverse torque transmission up to the torque level of the spring preload, which is set to be slightly greater than the anticipated maximum load due to torque in the backward direction. This configuration reduces susceptibility to vibrational resonance when subjected to torsional vibrations at the input or output members.

The present invention may be used in a number of diverse applications, but is particularly suited for applications that experience torsional vibration and/or torque reversals where a conventional planetary gear set would generate undesirable or unacceptable gear rattle. For example, the present invention may allow variable displacement engines to idle and drive at low engine speeds with fewer than all of the cylinders firing without unacceptable gear rattle. Also, the reduced or eliminated gear rattle should reduce noise, vibration, and harshness (NVH) with the uneven firing intervals that occur when an 8-cylinder engine operates in a reduced or variable displacement mode with 3, 5, or 7 firing cylinders, for example.

The above advantages and other advantages and features of the present invention will be readily apparent from the following detailed description of the preferred embodiments when taken in connection with the accompanying drawings.

DETAILED DESCRIPTION OF THE PREFERRED EMBODIMENT(S)

As those of ordinary skill in the art will understand, various features of the present invention as illustrated and described with reference to any one of the Figures may be combined with features illustrated in one or more other Figures to produce embodiments of the present invention that are not explicitly illustrated or described. The combinations of features illustrated provide representative embodiments for typical applications. However, various combinations and modifications of the features consistent with the teachings of the present invention may be desired for particular applications or implementations.

Figure 1:
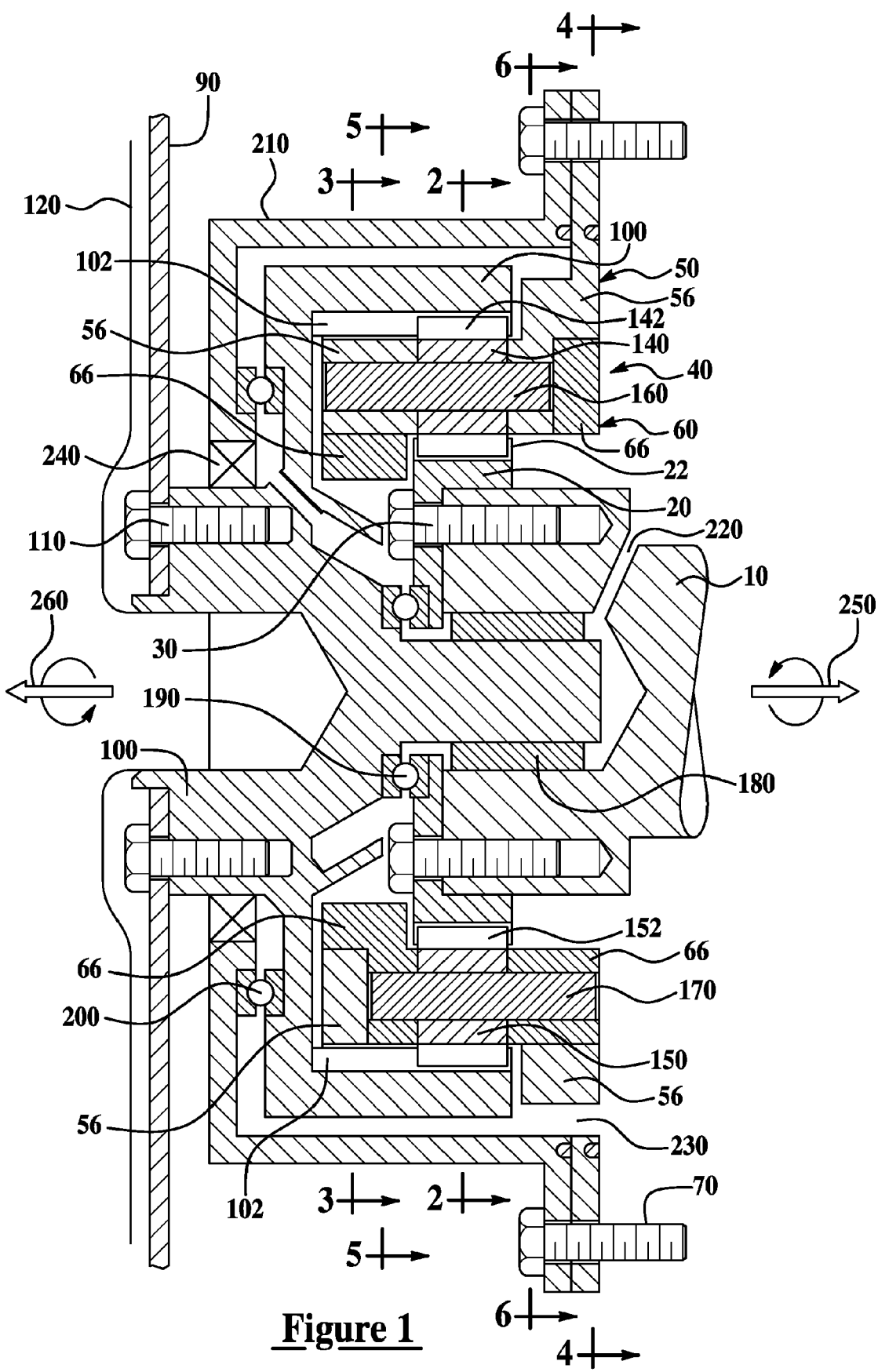
FIG. 1 is a partial side cross-section view of a representative application for a two-part carrier planetary gear set in a system or method for eliminating backlash to control gear rattle according to one embodiment of the present invention.

Referring now to FIG. 1, a side cross-section view of a representative application for a two-part carrier planetary gear set for coupling a drivetrain to an engine in a system or method for eliminating backlash to control gear rattle according to one embodiment of the present invention is shown. In this embodiment, the planetary gear set reverses rotational direction and provides a speed differential for a transmission/transaxle torque converter relative to an engine crankshaft. Of course, the present invention is not limited to automotive applications or those applications where the rotational direction from input to output is reversed. Those of ordinary skill in the art will recognize various other configurations and applications that may benefit from a planetary gear set according to the present invention with essentially zero effective backlash. For example a planetary gear set may be used to combine torques from an engine, an electric motor/generator, and one or more vehicle wheels in a hybrid vehicle application where none of the components of the gear set is held stationary, or with a different one of the three components held stationary with the other two rotating depending on the operating mode or conditions.

As shown in FIG. 1, in this representative application, engine output shaft or crankshaft 10 is fastened to sun gear 20, which acts as the input member, using one or more fasteners 30. A two-part planet carrier 40 includes a first part 50 and a second part 60. Stated differently, a planetary gear set according to the present invention includes a first planet carrier 50 and a second planet carrier 60. A plurality of fasteners 70 attaches first part 50 of planet carrier 40 to a fixed, non-rotating portion of an engine (not shown), such as the engine block, for example. Flex plate 90 is attached to ring gear 100 using a plurality of fasteners 110. Torque converter 120 is attached to flex plate 90 using a plurality of fasteners (not shown).

Each of a first set of planet pinion gears 140 includes at least one pinion or planet gear that rotates about an axle shaft 160 and is mounted on first part 50 of planet carrier 40 with gear teeth 142 constantly in mesh with gear teeth 102 of ring gear 100 and gear teeth 22 of sun gear 20. First part 50 of planet carrier 40 includes a rigid hoop structure 56 at each end of axle shaft 160 to ensure that gears 140 in the first set of planet pinions maintain proper alignment even when carrying a heavy load. Each of a second set of planet pinion gears 150, which includes one or more pinion or planet gears, rotates about an axle shaft 170 and is mounted on second part 60 of planet carrier 40 and has its gear teeth 152 constantly in mesh with gear teeth 102 of ring gear 100 and gear teeth 22 of sun gear 20. A corresponding rigid hoop structure 66 at each end of axle shaft 170 maintains proper alignment of the second set of pinions. As shown in FIG. 1, the axial (left-to-right in the Figure) orientation or positioning of axle shaft 160 is offset relative to axle shaft 170 to accommodate rigid hoop structures 56 and 66.

First set of planet pinion gears 140 and second set of planet pinion gears 150 have substantially identical gear tooth profiles. Needle bearings 180 support ring gear 100 inside an associated bore in crankshaft 10 such that relative rotational motion is permitted between ring gear 100 and crankshaft 10. Thrust bearing 190 restricts the forward axial movement of ring gear 100 to avoid contact with the forward part of planet carrier 40 and the heads of fasteners 30. Thrust bearing 200 is installed between ring gear 100 and rear seal carrier 210, and restricts rearward axial motion of ring gear 100. Appropriate installation of these thrust bearings will prevent fore/aft vibration of ring gear 100 potentially caused by reversing thrust loads imposed upon it by the planet gears 140, 150. Oil passage 220 supplies oil from the rear crankshaft main bearing of the engine to provide lubrication for the planetary gear set. Oil path 230 allows oil to drain out of the planetary gear set components and be returned to the oil sump of the engine (not shown). Various seals, such as oil seal 240 prevent loss of oil.

Figure 2:
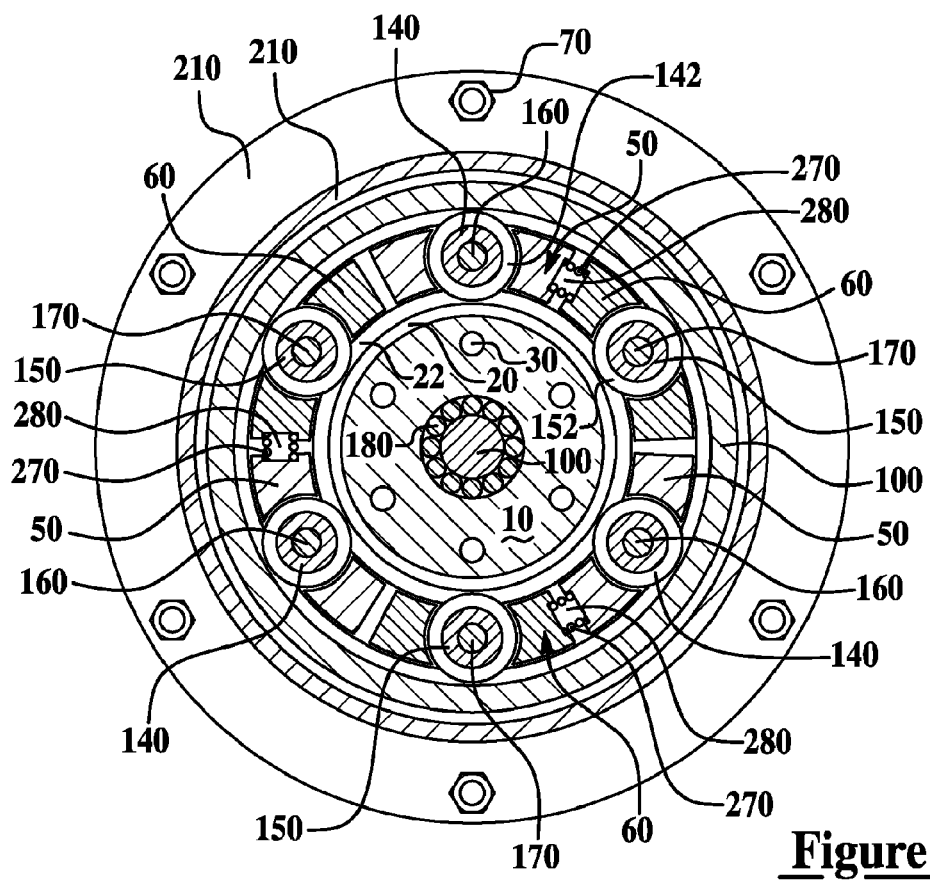
FIG. 2 is a section taken along line 2-2 of FIG. 1 illustrating planet pinion gears mounted on stationary and moveable parts of the planet carrier of the planetary gear set illustrated in FIG. 1.

FIG. 2 is a section taken along line 2-2 of FIG. 1 that shows positioning of the first set of planet pinion gears 140 relative to the second set of planet pinion gears 150 on first part 50 and second part 60, respectively, of planet carrier 40. In this embodiment, three planet pinion gears 140 and 150 are shown in the figure for each of the first and second sets of planet pinions. However, each set may include a different number of pinions, or sets having an equal or unequal number but more or fewer than three pinions each may be provided depending upon the particular application and implementation. As shown in FIG. 2, one or more biasing elements implemented by springs 270 are disposed within corresponding spaces 280 between first carrier 50 and second carrier 60. As such, second part 60 of planet carrier assembly 40 is spring loaded or biased relative to first part 50 of planet carrier 40. While simple compression springs are illustrated in the embodiment of FIG. 2, those of ordinary skill in the art will recognize that various other types of biasing elements may be used to provide a biasing force between first part 50 and second part 60. Similarly, the number of springs or other biasing elements and the spring force provided by each may vary depending upon the particular application and desired torque transmission characteristics in the forward and reverse torque transmission directions. According to one aspect of the present invention, the cumulative biasing force or spring preload of the combined springs is selected to be slightly greater than the maximum anticipated torque load in the backward or reverse direction as illustrated and described in greater detail with respect to FIGS. 13 and 14.

Figure 3:
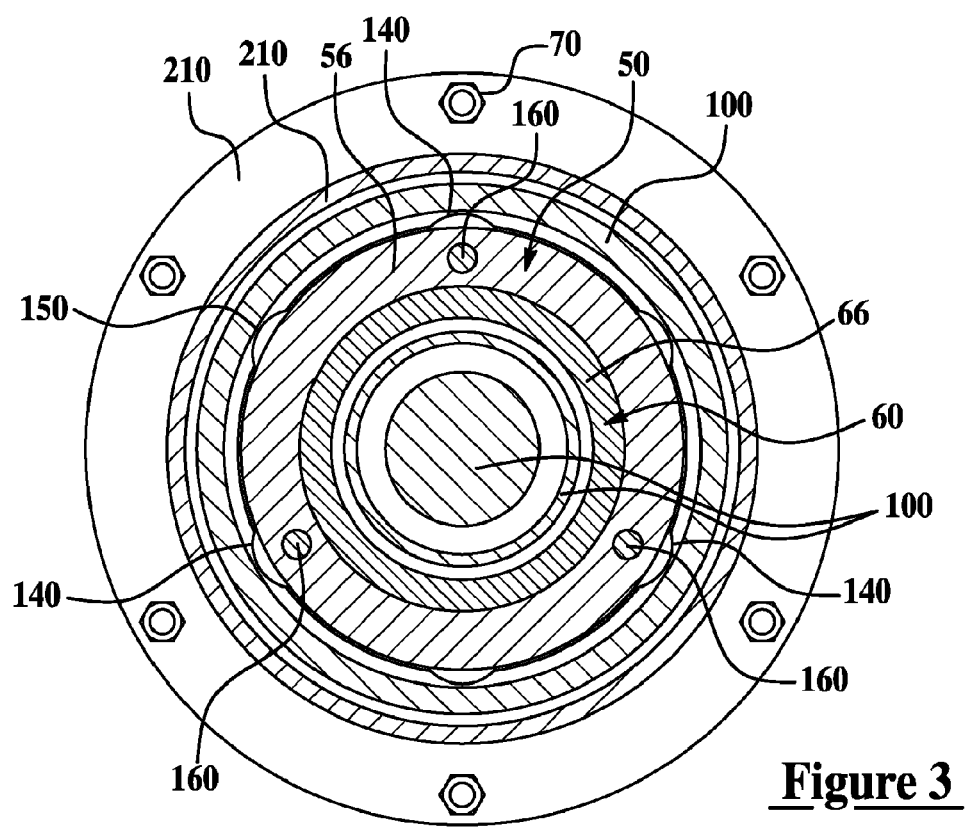
FIG. 3 is a section taken along line 3-3 of FIG. 1 illustrating a rigid hoop structure at the rear end of each of the axle shafts that carry planet pinion gears.
Figure 4:
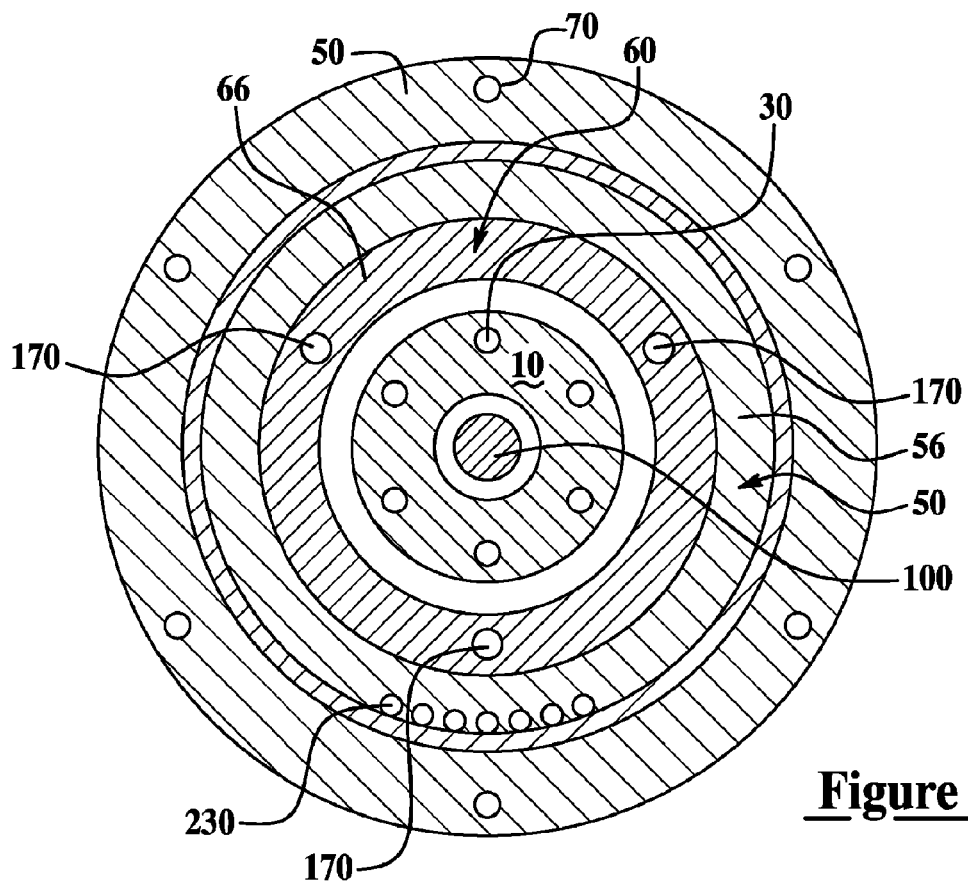
FIG. 4 is a section taken along line 4-4 of FIG. 1 illustrating a rigid hoop structure at the front end of each of the axle shafts that carry planet pinion gears.

FIG. 3 is a cross-section taken along line 3-3 of FIG. 1 and illustrates rigid hoop structure 56 of first part 50 of planet carrier 40 that maintains positioning of axle shafts 160 to ensure proper alignment of first set of planet pinions 140. FIG. 4 is a cross-section taken along line 4-4 of FIG. 1 and illustrates rigid hoop structure 66 of second part 60 of planet carrier 40 that maintains positioning of axle shafts 170 to ensure proper alignment between pinions 150 of the second set of planet gears. As previously described, the rigid hoop structures associated with first part 50 and second part 60 of planet carrier 40 at the end of each axle shaft 160 and 170, respectively, ensure that the proper centerline alignment of planet pinion gears 140 and planet pinion gears 150 is maintained even when the planetary gear set is carrying a heavy load.

Figure 5:
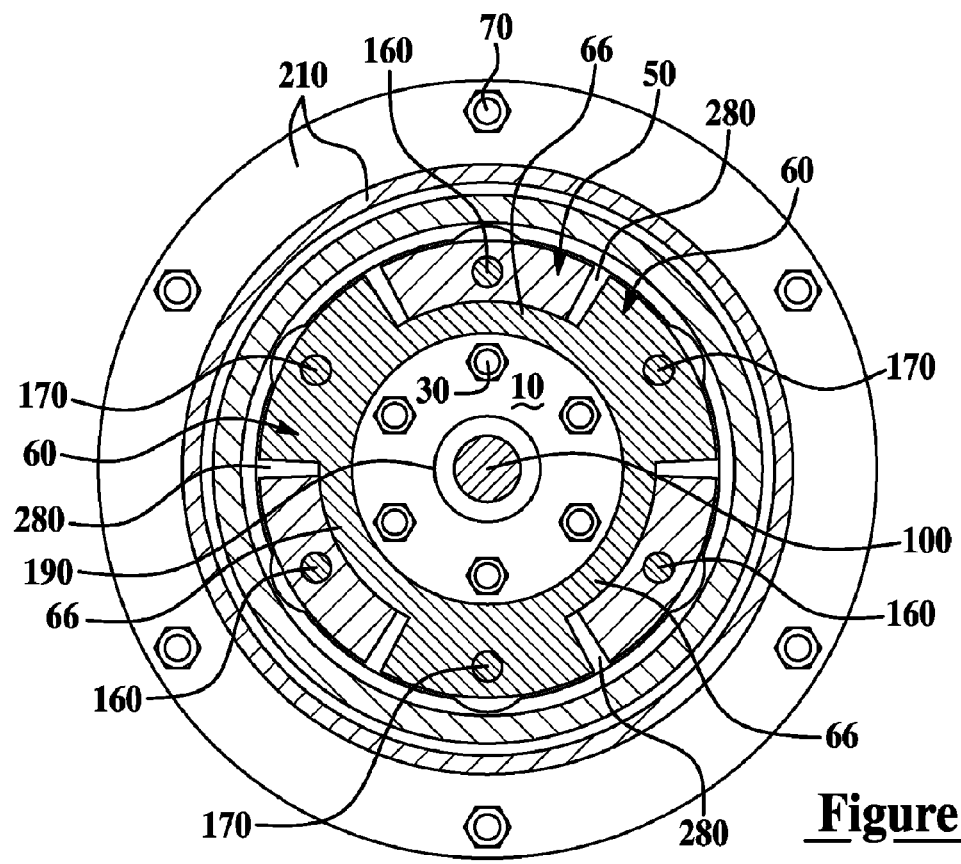
FIG. 5 is a section taken along line 5-5 of FIG. 1 illustrating how loads are transferred to the rigid hoop structures at the rear end of the axle shafts and available package space for additional preload springs.
Figure 6:
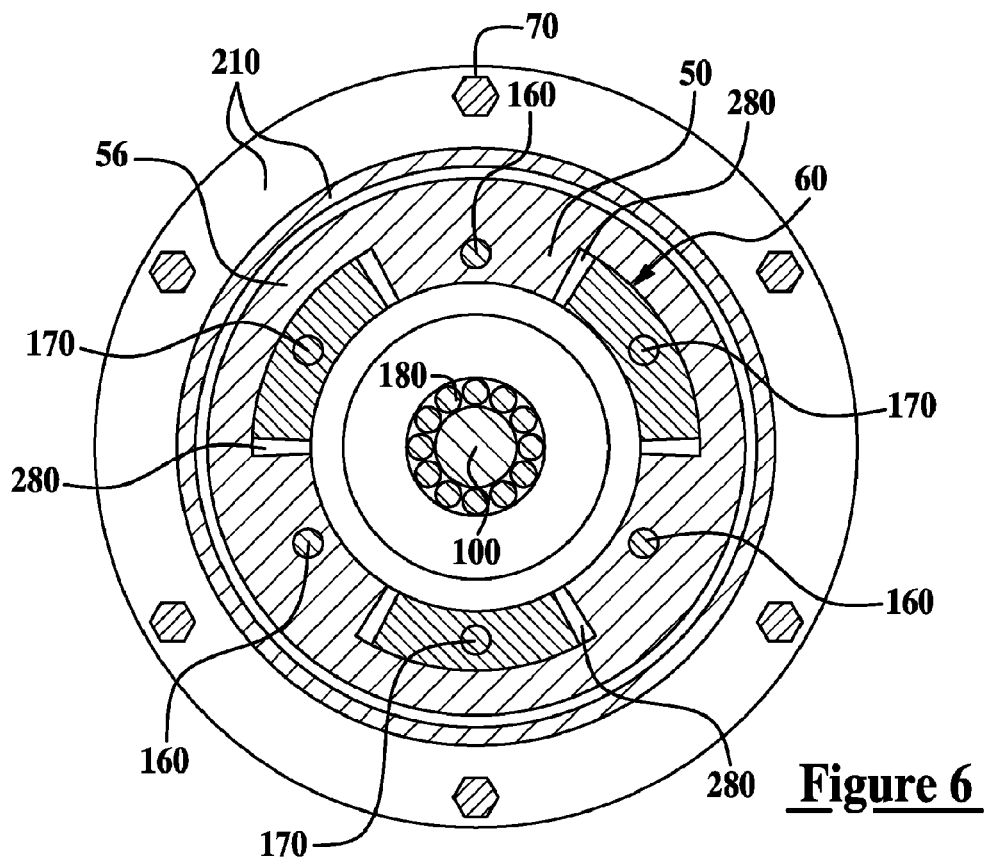
FIG. 6 is a cross section taken along lines 6-6 of FIG. 1 illustrating how loads are transferred to the rigid hoop structures at the front end of the axle shafts and available package space for additional preload springs.

Loads from axle shafts 160 and axle shafts 170 are transferred to the rigid hoop structures of first part 50 and second part 60 of planet carrier 40 as shown in FIGS. 5 and 6. FIG. 5 is a cross-section taken along line 5-5 of FIG. 1 illustrating rigid hoop structure 66 and FIG. 6 is a cross section taken along line 6-6 of FIG. 1 illustrating rigid hoop structure 56. Also shown in FIGS. 5 and 6 are additional package spaces 280 available for additional springs 270 or other biasing devices if desired for a particular application.

As can be seen with reference to FIGS. 1-6, in operation, crankshaft 10 rotates in a first direction indicated generally by arrow 250 in FIG. 1. (Arrows 250 and 260 illustrate direction of rotation by use of the right hand rule where rotational direction is indicated by pointing the right-hand thumb in the direction of the straight arrow and closing the hand to make a fist such that the motion of the fingers indicates the direction of rotation.) Because sun gear 20 is attached to crankshaft 10 using a plurality of fasteners 30, sun gear 20 rotates in the same direction as crankshaft 10 and also carries crankshaft 10 torque, which is the input torque to the gear set. First part 50 of planet carrier 40 is rendered stationary by a plurality of fasteners 70 attaching it to a fixed, non-rotating portion of the engine (not shown). Thus, first part 50 of planet carrier 40 acts as a reaction element of the planetary gear set.

Each of the sets of planet pinion gears 140 and 150, being in mesh with sun gear 20, rotate about their axes in a direction opposite to that of sun gear 20. Therefore, the direction of rotation of planet pinion gears 140 and 150, as generally indicated by arrow 260, is opposite that of crankshaft 10. Planet pinion gears 140 and 150 are also in mesh with ring gear 100. The rotation of planet pinion gears 140 forces ring gear 100 to rotate in the same direction, opposite to crankshaft 10. Ring gear 100, being the output member of the gear set, carries the output torque of the planetary gear set. Ring gear 100 is connected to flex plate 90 using a plurality of fasteners 110. As such, flex plate 90 also turns in the same direction as ring gear 100. Flex plate 90 is connected to torque converter 120 using a plurality of fasteners (not shown) forcing torque converter 120 to also rotate in the same direction and carry the same torque as that on ring gear 100. Thus torque converter 120 rotates in a direction opposite to that of crankshaft 10 in this representative application.

Figure 7:
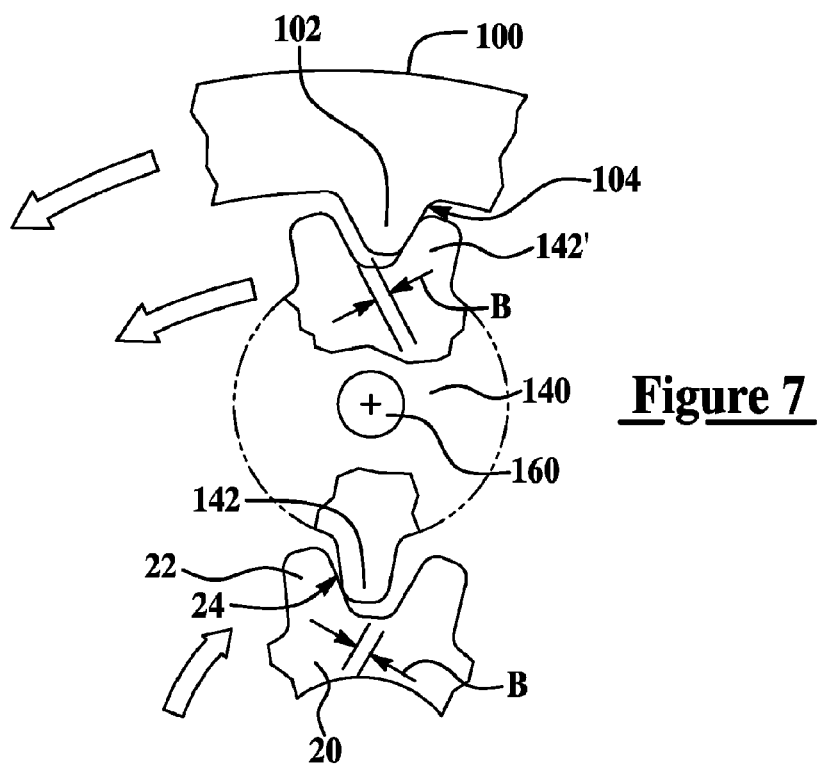
FIG. 7 illustrates gear teeth of a typical planet pinion gear mounted on the first part of the planet carrier contacting gear teeth of the sun gear and ring gear when the sun gear (being the input member) carries positive forward torque.
Figure 8:
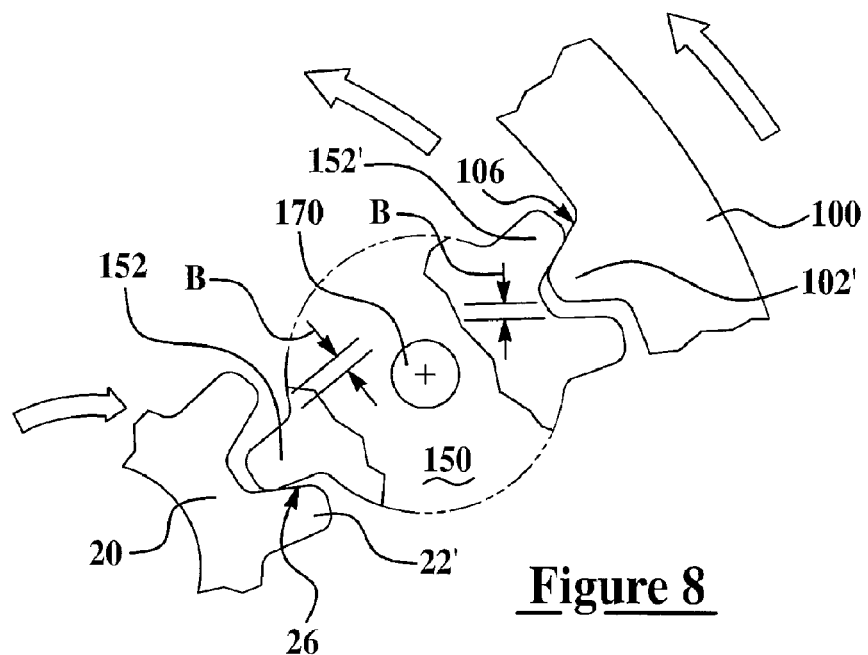
FIG. 8 illustrates gear teeth of a typical planet pinion gear mounted on the second part of the planet carrier contacting gear teeth of the sun gear and ring gear.

Referring now to FIGS. 7 and 8, when sun gear 20 carries positive forward torque of crankshaft 10 and rotates in the same direction as crankshaft 10, looking from the torque converter 120 end toward the engine (not shown), planet pinion gear 140 will have a driven side of a representative gear tooth 142 contact the drive side 24 of gear tooth 22 of sun gear 20 and the driving side of another gear tooth 142' contact the drive side 104 of gear tooth 102 of ring gear 100. Space B indicates the clearance or potential backlash that would generate gear rattle in a conventional planetary gear set when the direction of torque transmission is reversed resulting in the coast sides of the meshing gear teeth impacting one another. Planet pinion gear 140, as well as ring gear 100, rotates in a counter-clockwise direction as indicated by the arrows in FIG. 7. According to the present invention, at least one planet pinion gear 150 will have one side of a gear tooth 152 contacting the coast side 26 of a corresponding meshing gear tooth 22' of sun gear 20 as shown in FIG. 8. As also shown in FIG. 8, planet pinion gear 150 has the side of another gear tooth 152' contacting the coast side 106 of gear tooth 102' of ring gear 100. Space B is the clearance or backlash. In the absence of a biasing force between pinions associated with a common sun gear and ring gear according to the present invention, during torque reversals, or at idle, the gears would change direction of load through the clearance/backlash and impact both sides of teeth in meshing engagement resulting in gear rattle. While the present invention provides sufficient clearance or backlash between meshing gear teeth to avoid additional internal stress and noise associated with binding or a tight, noncompliant mesh condition, the present invention essentially eliminates the "effective backlash" of the overall planetary gear set and thereby eliminates any associated gear rattle. In the present invention, the effective backlash is substantially zero under normal operating conditions due to simultaneous contact of the drive sides of teeth of sun gear 20 and ring gear 100 with gear teeth of planet pinion gears 140 and contact of the coast sides of teeth of sun gear 20 and ring gear 100 with gear teeth of planet pinion gears 150. This type of construction ensures backlash to be substantially zero in all angular positions without forcing mating gear teeth to be in a tight, noncompliant mesh condition. The spring load automatically and dynamically adjusts the lash to zero and prevents creation of high stresses due to gear run-out and/or differential thermal expansion. This type of construction offers high torsional stiffness in the positive torque transmission direction equivalent to the stiffness of a conventional planetary gear set. In the direction of backward or reverse torque transmission, this type of construction offers equivalent stiffness to that in the forward direction up to the level of spring preload, which is slightly greater than the anticipated maximum load due to torque in the backward direction. Thus, the present invention offers high stiffness in forward and backward torque transmission directions and is less susceptible to resonance induced by torsional vibrations acting on the input or output.

In the present invention, the drive sides 24 of gear teeth 22 of sun gear 20 which are in contact with gear teeth 142 of planet pinion gears 140, not only transmit the loads from crankshaft 10, but also the spring load. Gear teeth 142 of planet pinion gears 140 are also in contact with the drive side 104 of gear teeth 102 of ring gear 100 and therefore transmit the combined load to ring gear 100. Planet pinion gears 150 carry a load approximately equal to the preload of spring 270 between first part 50 and second part 60 of planet carrier 40. The spring load prevents separation and subsequent impact between gear teeth of planet pinion gears 140 with the coast side 26 of gear teeth 22' of sun gear 20 and coast side 106 of gear teeth 102' of ring gear 100. Thus, rattle due to gear teeth moving through the clearance or lash and impacting gear teeth on meshing gears is prevented.

Figure 9:
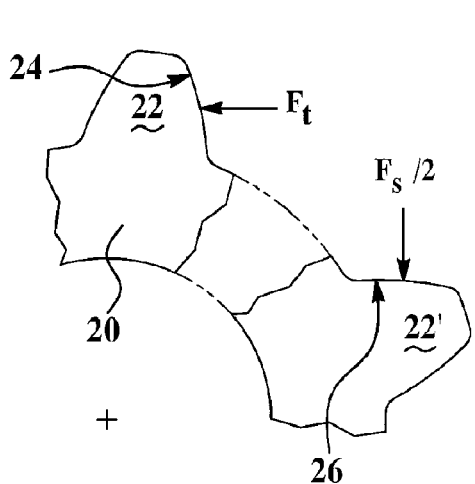
FIG. 9 shows the tangential tooth loads on gear teeth of the sun gear due to contact with a gear tooth of a typical planet pinion gears mounted on the first and second parts of the planet carrier.
Figure 10:
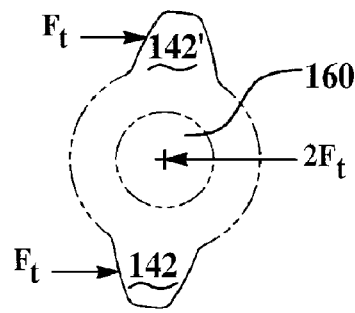
FIG. 10 shows tangential tooth loads on gear teeth of a planet pinion gear mounted on the first part of the planet carrier due to contact with a gear tooth on the sun gear and a gear tooth on the ring gear when the sun gear carries positive forward torque.

FIGS. 9-12 illustrate gear tooth loads on the various gears of a planetary gear set according to one embodiment of the present invention. Tangential tooth loads indicated by $F_t$ act on the drive side 24 of a gear tooth 22 of sun gear 20 that is in contact with a gear tooth 142 of a planet pinion 140 as shown in FIGS. 9 and 10. Also shown is the tangential tooth load indicated by $F_s/2$ acting on the coast side 26 of a gear tooth 22' of sun gear 20 that is in contact with a gear tooth 152 of a planet pinion gear 150, where $F_s$ represents the spring force or load. As shown in the Figures, the input torque carried by sun gear 20 gets transferred to ring gear 100 through planet pinion gears 140 mounted on the first part 50 of planet carrier 40.

FIG. 10 shows the tangential tooth load, represented by $F_t$ on the side of a gear tooth 142 of planet pinion gear 140 that is in contact with the drive side 24 of a gear tooth 22 of sun gear 20. Also shown is another tangential tooth load indicated by $F_t$ acting on the side of a gear tooth of planet pinion gear 140 that is in contact with the drive side 104 of a gear tooth 102 of ring gear 100. To balance the tangential tooth loads indicated by $F_t$ on both gear teeth, there is a corresponding load $2(F_t)$ on the axle shaft 160 in the opposite direction to maintain equilibrium.

Figure 11:
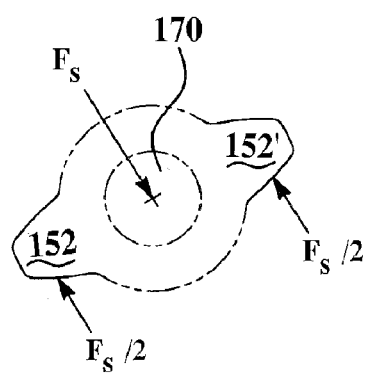
FIG. 11 shows tangential tooth loads due to the spring load on gear teeth of a planet pinion gear mounted on the second part of the planet carrier due to contact with a gear tooth on the sun gear and a gear tooth on the ring gear.

FIG. 11 shows the spring force indicated by $F_s$ acting on a planet pinion gear 150. To maintain equilibrium, tangential tooth loads indicated by $F_s/2$ act on the side of the gear tooth 152 of planet pinion gear 150 that is in contact with the coast side 26 of a gear tooth 22' of sun gear 20 and the side of the gear tooth of planet pinion gear 150 that is in contact with the coast side 106 of a gear tooth 102' of ring gear 100.

Figure 12:
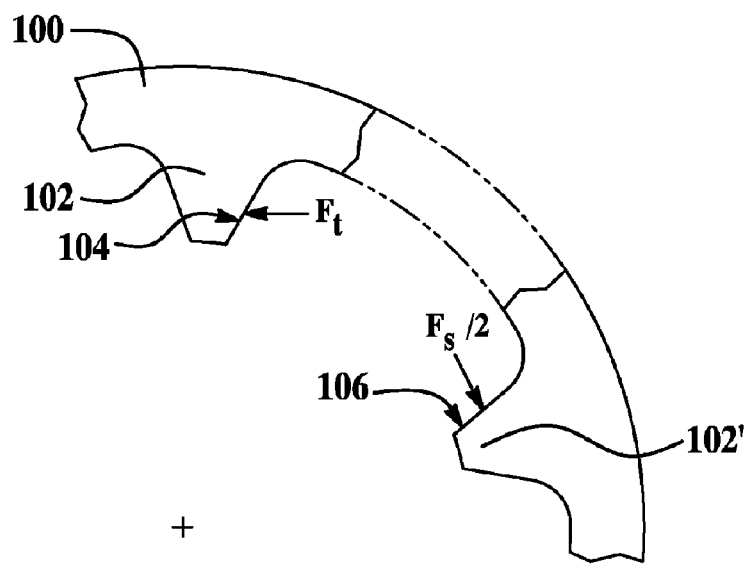
FIG. 12 shows tangential tooth loads on gear teeth of the ring gear due to contact with a gear tooth of typical planet pinion gears mounted on the first and second parts of the planet carrier when the sun gear carries positive forward torque.

FIG. 12 shows the tangential tooth load indicated by $F_t$ on the drive side 104 of a gear tooth 102 of ring gear 100 that is in contact with a gear tooth 142' of a planet pinion gear 140. Also shown is the tangential tooth load indicated by $F_s/2$ on the coast side 106 of a gear tooth 102' of ring gear 100 that is in contact with a gear tooth 152 of a planet pinion gear 150.

Figure 13:
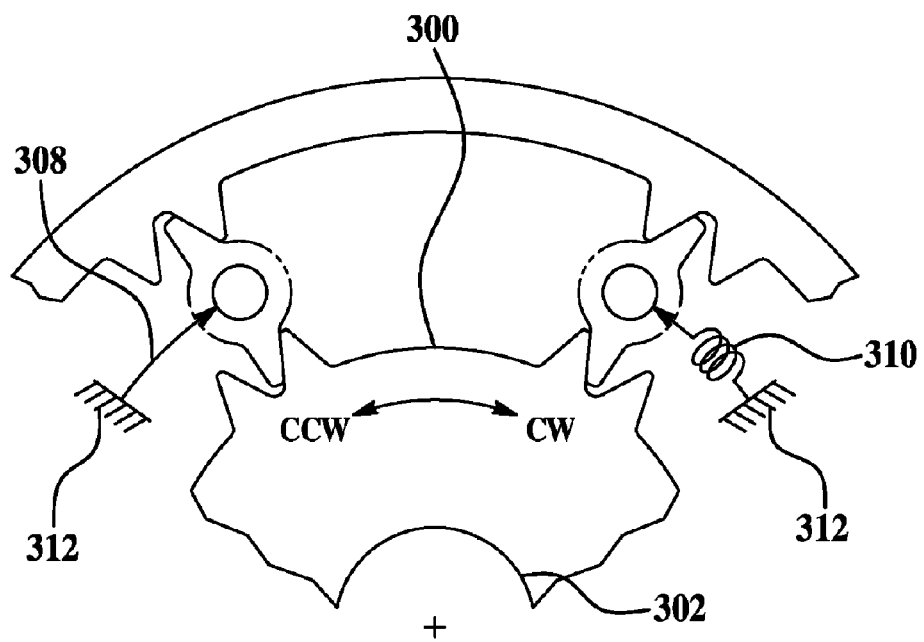
FIG. 13 illustrates the relationship between forward and reverse torque transmission characteristics based on elasticity of a member constrained between springs of differing elastic constants corresponding to biasing members and gear teeth of a planetary gear set according to the present invention.
Figure 14:
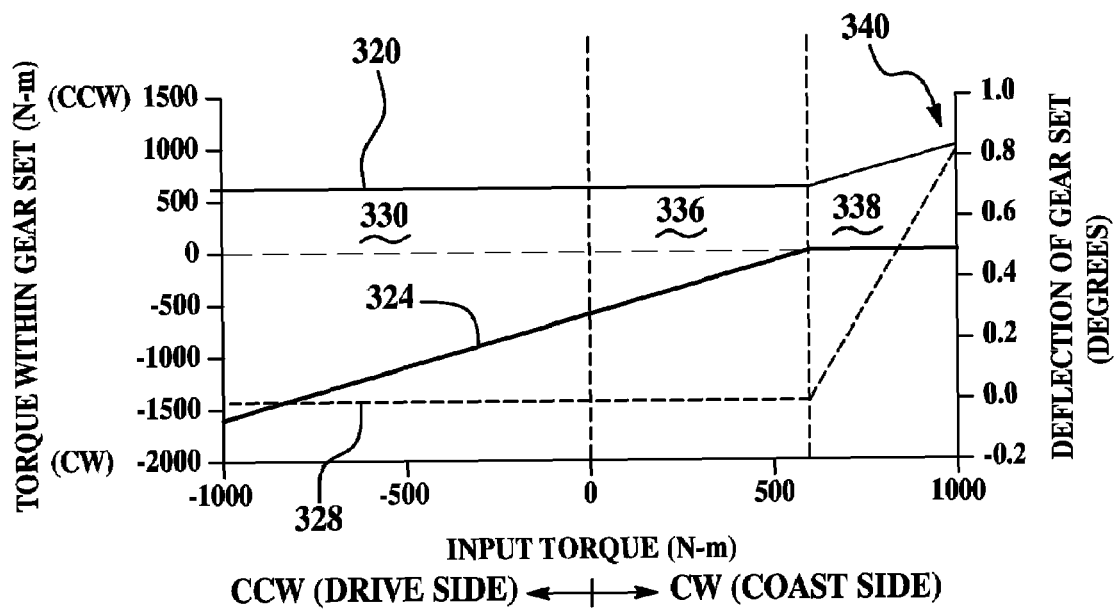
FIG. 14 is a graph illustrating elasticity of a representative planetary gear set having a fixed carrier and rotatable carrier with biasing springs therebetween for forward and reverse torque transmission directions according to the present invention.

FIGS. 13 and 14 illustrate the relationship between forward and reverse torque transmission characteristics based on elasticity of a member constrained between springs of differing elastic constants corresponding to biasing members and gear teeth of a planetary gear set according to the present invention. As shown in FIG. 13, sun gear 300 pivots about bearing support 302 based on an applied load in a clockwise (cw) or counter-clockwise (ccw) direction relative to the spring constant $K_1$ associated with spring 308, the elasticity of the planet gear without insertion of an auxiliary spring, and constant $K_2$ associated with spring 310. Springs 308 and 310 are compression springs that are installed against a fixed constraint 312 with each spring, 308 and 310, putting a preload on sun gear 300 based on each spring's displacement from its free length and its corresponding spring constant. To maintain sun gear 300 at equilibrium (zero degrees rotation) with no externally applied load, the preload of spring 308 is equal to the preload of spring 310. However, the spring constant $K_1$, which represents the elasticity of a representative gear tooth in a planetary gear set according to the present invention, is orders of magnitude greater than the spring constant $K_2$, which represents the combined elasticity of biasing members disposed between the first and second planet carriers or carrier parts. When sun gear 300 is rotated in either direction by an applied load, one of springs 308, 310 will have a reduced compressive load while the other will have an increased compressive load. However, because both springs have unchanging spring constants throughout their normal range of deflection (displacement), the overall or combined spring constant in both directions remains unchanged as long as each spring maintains contact with member 300. If member 300 is rotated clockwise to a point where spring 308 (with a higher constant $K_1$ relative to $K_2$) reaches the end of its extension and loses contact with member 300, the elastic curve changes and any additional clockwise rotation will be resisted by spring 310 alone. As applied to the present invention, the spring preload is advantageously set using one or more springs or other biasing members to a magnitude greater than the maximum anticipated load in the coast direction so that during all modes of normal operation, the effective spring rate is the sum of the elastic rate of the gear teeth (very stiff) and the elastic rate of the spring (much softer). As such, the overall spring rate or elasticity in both directions is nearly identical, as illustrated in the graph of FIG. 14.

FIG. 14 illustrates elasticity of a representative planetary gear set with biasing springs between first and second planet carriers and an externally applied load in forward (drive) and reverse (coast) directions. The graph of FIG. 14 assumes an elasticity or spring constant $K_1$ of 99,500 N-m/deg for a representative gear tooth, a spring constant $K_2$ of 500 N-m/deg for biasing members disposed between planet carriers, and a preload of 600 N-m. Line 320 of FIG. 14 represents torque on the spring-loaded coast side of a representative gear tooth, line 324 represents torque in the forward (drive) direction of a representative gear tooth, and line 328 represents relative clockwise rotation of a representative sun gear associated with the spring-biased planet carrier under an externally applied torque as represented by the x-axis, which is the combined value of the load torque represented by lines 320 and 324. When the applied torque is in the same direction as the spring pre-load, the gear teeth see a load almost equivalent to the sum of the spring pre-load and the applied torque. Because of the very small elastic deformation of the gear teeth, the spring pre-load is only very slightly reduced as generally represented by area 330 of the graph where the applied torque is negative.

When the applied torque is in the direction opposed by the spring pre-load (positive in the graph), but smaller in magnitude than the spring pre-load as represented by area 336, the elastic deformation of the gear teeth caused by the spring pre-load is reduced, but the overall deformation rate of the gear set is determined by the sum of the two spring constants (the spring constant of the gear tooth plus that of the pre-loading spring) that are being deflected.

When the torque applied against the spring pre-load exceeds that of the pre-load as generally represented in area 338, the force applied to the rigid (drive) side of the gear tooth is reduced to zero and any additional applied torque is resisted by the pre-load spring alone, resulting in the deformation rate increasing greatly. The additional deflection or compression of the springs results in a gap between mating gear teeth, as represented at 340, and can lead to an impact that generates gear rattle as a result of a load reversal of sufficient magnitude.

Figure 15:
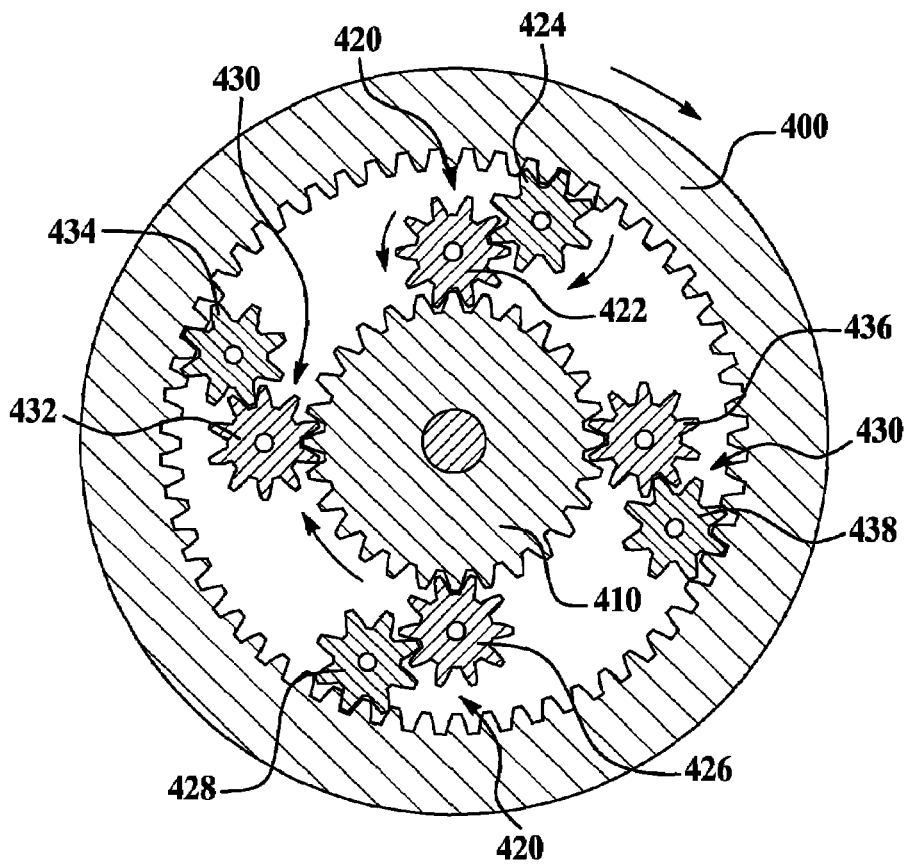
FIG. 15 is a cross-section illustrating another embodiment of a planetary gear set for reducing gear rattle by eliminating effective backlash according to the present invention.

FIG. 15 is a cross-section illustrating an another embodiment of a planetary gear set for reducing gear rattle by eliminating effective backlash according to the present invention. In the embodiment of FIG. 15, the planetary gear set includes a ring gear 400 with a first set 420 and second set 430 of planetary gears in meshing engagement between ring gear 400 and a sun gear 410. In this particular example of a double planet gear implementation, first set 420 includes a first pair or double of planet gears 422, 424 disposed opposite a second pair 426, 428 on a first common carrier (not shown). Similarly, second set 430 includes a first pair 432, 434 disposed opposite a second pair 436, 438 with corresponding axes mounted to a second common carrier or carrier part (not shown). As indicated by the arrows in FIG. 15, this configuration rotates ring gear 400 in the same direction as sun gear 410 when the planet carriers are held stationary. To provide essentially zero effective backlash as described with reference to other embodiments, one or more biasing elements may be used to bias, rotationally, the first carrier or carrier part relative to the second carrier or carrier part.

In another double planet gear embodiment similar to the arrangement illustrated in FIG. 15, the gears of the planet gear pairs, such as gears 422 and 424, for example, are helical gears with opposite hand, e.g. gear 422 would be a left-hand helical gear and gear 424 would be a right-hand helical gear. As in the previous example, planet gear pair 422, 424 is disposed opposite a second pair 426, 428 on a first common carrier to comprise gear set 420. Similarly, a second gear set 430 includes a first pair 432, 434 disposed opposite a second pair 436, 438 mounted to a second common carrier. A biasing force is then applied between the two carriers in an axial direction (into or out of the page of FIG. 15), while constraining, or preventing rotation of the two carriers relative to each other. The axial biasing force acting on the meshing helical gear surfaces creates a circumferential or tangential force based on the helix angle to remove the lash of the gear set (including sun gear 410, planet gears on both carriers, and ring gear 400). Note that the helix angle is required to translate the axial force to a tangential or circumferential force so that this strategy would not be directly transferable to gear sets with single planet gears or with straight cut gears.

As previously described, appropriate selection of springs or other biasing element(s) to provide a biasing force or spring load between at least one planet pinion gear pair in a first set mounted on first part of a planet carrier and at least one planet pinion gear pair in a second set mounted on a second part of the planet carrier according to the present invention may be used to automatically and dynamically eliminate effective backlash of the gear set in all angular positions while preventing creation of high stresses due to gear run-out. The present invention also allows high stiffness in forward and backward directions of torque transmission to prevent vibrational resonance when subjected to torsional or rotational vibrations on the input or output element of the gear set.

While specific embodiments for carrying out the invention have been described in detail, those familiar with the art to which this invention relates will recognize various alternative designs and embodiments for practicing the invention as defined by the following claims.

What is claimed is:

1. A method for reducing gear rattle in a planetary gear set having at least one sun gear, at least one ring gear, and a plurality of pinion gears in constant meshing engagement with the sun gear and the ring gear, the method comprising:

biasing at least one first pinion gear mounted on a first carrier in an opposite direction relative to at least one second pinion gear mounted on a second carrier such that the at least one first pinion contacts a drive side of a ring gear tooth and a sun gear tooth and the at least one second pinion contacts a coast side of a ring gear tooth and a sun gear tooth.

2. The method of claim 1 further comprising securing the first carrier to stationary structure to prevent rotation of the first carrier relative to the structure.

3. The method of claim 1 wherein the step of biasing comprises biasing using a plurality of springs disposed between the first and second carriers.

4. The method of claim 1 further comprising positioning the first and second carriers to allow angular movement of the second carrier relative to the first carrier.

5. The method of claim 1 further comprising:
mounting a first plurality of pinion gears to the first carrier; and
mounting a second plurality of pinion gears to the second carrier.

6. The method of claim 5 wherein the mounting steps comprise:
securing an axle shaft corresponding to each of the first plurality of pinion gears to a common rigid hoop structure.

7. The method of claim 5 wherein the first plurality of pinion gears exceeds in number the second plurality of pinion gears.

8. The method of claim 1 wherein the step of biasing comprises positioning a plurality of compression springs at not less than two axial locations.

9. A planetary gear set comprising:
a sun gear having a plurality of teeth, each tooth having a drive side and a coast side;
a ring gear having a plurality of teeth, each tooth having a drive side and a coast side;
a first carrier supporting at least one first planet pinion gear, each of the at least one first planet pinion gear being disposed between, and in meshing engagement with, the sun gear and the ring gear and having a plurality of teeth, each tooth having a driven side and driving side;
a second carrier supporting at least one second planet pinion gear, each of the at least one second planet pinion gear being disposed between, and in meshing engagement with, the sun gear and the ring gear and having a plurality of teeth, each tooth having a driven side and a driving side; and
a biasing device associated with the first and second carriers to bias the first and second carriers away from each other so that teeth of the at least one first planet pinion gear contact the drive side of corresponding teeth of the sun gear and the ring gear, and teeth of the at least one second planet pinion gear contact the coast side of corresponding teeth of the sun gear and the ring gear.

10. The planetary gear set of claim 9 wherein the biasing device comprises a plurality of compression springs.

11. The planetary gear set of claim 9 wherein at least one of the first and second carriers includes a plurality of planet pinion gears substantially equally angularly spaced about the sun gear.

12. The planetary gear set of claim 9 wherein the at least one first planet pinion gear carrier includes a first plurality of planet pinion gears and wherein the first carrier comprises:
a planet pinion gear axle shaft corresponding to each of the first plurality of planet pinion gears and mounted between opposing rigid hoop structures to maintain alignment of the first plurality of planet pinion gears relative to one another.

13. The planetary gear set of claim 9 wherein the at least one first planet pinion gear carrier includes a first plurality of substantially similar planet pinion gears.

14. The planetary gear set of claim 9 wherein the at least one first planet pinion gear carrier comprises a first plurality of planet pinion gears and the at least one second planet pinion gear carrier comprises a second plurality of planet pinion gears.

15. The planetary gear set of claim 14 wherein the first plurality and second plurality of planetary pinion gears are equal in number.

16. The planetary gear set of claim 14 wherein the first plurality of planetary pinion gears is greater in number than the second plurality of planetary pinion gears.

17. A system for reducing gear rattle in a planetary gear set having a sun gear, a ring gear and a plurality of planet pinion gears disposed between and in meshing engagement with the sun gear and the ring gear, the system comprising:
a first carrier having at least one axle shaft for supporting at least one of the plurality of planet pinion gears; and
a second carrier having at least one axle shaft for supporting at least a second one of the plurality of pinion gears, wherein the second carrier is rotatable relative to the first carrier and biased in a rotational direction.

18. The system of claim 17 further comprising a plurality of springs disposed between the first and second carriers to rotationally bias the first and second carriers.

19. The system of claim 17 wherein the first and second carriers are rotationally biased so that at least one planet pinion gear mounted on the first carrier has teeth contacting a drive side of teeth on the ring gear and the sun gear and at least one planet pinion gear mounted on the second carrier has teeth contacting a coast side of teeth on the ring gear and the sun gear.

20. The system of claim 17 wherein the first carrier includes a different number of planet pinion gears than the second carrier.

* * * * *